United States Patent
Baxter, III et al.

(10) Patent No.: US 9,030,464 B2
(45) Date of Patent: May 12, 2015

(54) SIMULATING PAINTING

(75) Inventors: William Valentine Baxter, III, Kirkland, WA (US); Siu Hang Chu, Redmond, WA (US); Naga K. Govindaraju, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 595 days.

(21) Appl. No.: 12/756,190

(22) Filed: Apr. 8, 2010

(65) Prior Publication Data
US 2011/0251829 A1   Oct. 13, 2011

(51) Int. Cl.
 *G06T 15/00* (2011.01)
 *G06T 11/00* (2006.01)

(52) U.S. Cl.
 CPC .................................. *G06T 11/001* (2013.01)

(58) Field of Classification Search
 None
 See application file for complete search history.

(56) References Cited

U.S. PATENT DOCUMENTS

| | | | | |
|---|---|---|---|---|
| 5,175,625 | A * | 12/1992 | Miles | 348/563 |
| 5,216,755 | A * | 6/1993 | Walker et al. | 345/591 |
| 5,276,787 | A * | 1/1994 | Searby | 345/428 |
| 6,348,924 | B1 | 2/2002 | Brinsmead | |
| 6,603,463 | B1 * | 8/2003 | Rising, III | 345/179 |
| 6,606,086 | B1 * | 8/2003 | Sumner | 345/173 |
| 7,384,667 | B2 | 6/2008 | Blanco | |
| 7,511,703 | B2 * | 3/2009 | Wilson et al. | 345/175 |
| 7,639,250 | B2 | 12/2009 | Xu et al. | |
| 2006/0084039 | A1 | 4/2006 | Ryokai et al. | |
| 2009/0051684 | A1 | 2/2009 | Maillot et al. | |
| 2013/0120436 | A1 * | 5/2013 | Krishnaswamy et al. | 345/594 |

OTHER PUBLICATIONS

Chu, N.S.H.; Chiew-Lan Tai; , "Real-time painting with an expressive virtual Chinese brush," Computer Graphics and Applications, IEEE , vol. 24, No. 5, pp. 76-85, Sep.-Oct. 2004.*

Baxter III, William Valentine, "Physically-Based Modeling Techniques for Interactive Digital Painting", Retrieved at << http://www.billbaxter.com/dissertation/Baxter-dissertation.pdf >>, 2004, pp. 1-269.
"Chapter 33: User Models", Retrieved at << http://www.tiem.utk.edu/~sada/beta5/Chapter33_Inserted_UserModels.pdf >>, 2008, pp. 1-21.
Xu, et al., "Advanced Design for a Realistic Virtual Brush", Retrieved at << http://citeseerx.ist.psu.edu/viewdoc/download?doi=10.1.1.60.7757&rep=rep1&type=pdf >>, Computer Graphics Forum (EG 2003), vol. 22, No. 3, Sep. 2003, pp. 1-10.
Kim, et al., "A Haptic-Rendering Technique based on Hybrid Surface Representation", Retrieved at << http://ieeexplore.ieee.org/stamp/stamp.jsp?tp=&arnumber=1274064&isnumber=28513 >>, IEEE Computer Graphics and Applications, vol. 24, Issue 2, Mar. 2004, pp. 66-75.
Xu, Songhua, "Magic Brush—A Novel Digital Painting Environment", Retrieved at << http://i.cs.hku.hk/~songhua/pub/vcCompetition_camera_ready.pdf >>, CiteSeerX—Scientific Literature Digital Library and Search Engine (United States), 2009, pp. 1-8.
Adams, et al., "Interactive 3D Painting on Point-Sampled Objects", Retrieved at << http://graphics.cs.kuleuven.be/publications/I3DPoPSO/adams04a.pdf>>, Proceedings of the Eurographics Symposium on Point-Based Graphics 2004, Jun. 2-4, 2004, pp. 1-10.
Baran, et al., "Automatic Rigging and Animation of 3d Characters", Retrieved at << http://people.csail.mit.edu/jovan/assets/papers/baran-2007-ara.pdf>>, Proceedings of ACM SIGGRAPH 2007, vol. 26 , Issue 3, Jul. 2007, pp. 1-8.
Baxter, et al., "A Versatile Interactive 3D Brush Model", Retrieved at << http://gamma.cs.unc.edu/BRUSH/Baxter-Lin-PG04-Submission.pdf >>, Proceedings of the Computer Graphics and Applications, 12th Pacific Conference 2004, Oct. 6-8, 2004, pp. 1-10.
Baxter III, et al.,"Dab: Interactive Haptic Painting with 3D Virtual Brushes", Retrieved at << http://gamma.cs.unc.edu/DAB/ >>, Proceedings of ACM SIGGRAPH200, Aug. 12-17, 2001, pp. 1-8.

(Continued)

*Primary Examiner* — Daniel Hajnik
(74) *Attorney, Agent, or Firm* — Steve Wight; Judy Yee; Micky Minhas

(57) ABSTRACT

A paint simulation system described herein includes a brush component that outputs a three-dimensional computer-implemented model of an image editing tool. A paint component receives the three-dimensional computer-implemented model and generates a two-dimensional map corresponding to a footprint of the three-dimensional model with respect to a computer-implemented canvas, wherein resolution of the two-dimensional map is substantially similar to resolution of a paint map of the computer-implemented canvas.

20 Claims, 10 Drawing Sheets

(56) References Cited

OTHER PUBLICATIONS

Chu, et al., "An Efficient Brush Model for Physically-Based 3D Painting", Retrieved at << http://ieeexplore.ieee.org/stamp/stamp.jsp?arnumber=01167885 >>, Proceedings of the 10th Pacific Conference on Computer Graphics and Applications (PG'02), Oct. 9-Oct. 11, 2002, pp. 1-9.

Cordier, et al., "A Data-driven Approach for Real-Time Clothes Simulation", Retrieved at << http://ieeexplore.ieee.org/stamp/stamp.jsp?tp=&arnumber=1348356&isnumber=29648 >>, Proceedings of the 12th Pacific Conference on Computer Graphics and Applications (PG'04), Oct. 6-8, 2004, pp. 1-10.

Muller, et al., "Meshless Deformations Based on Shape Matching", Retrieved at << http://www.beosil.com/download/MeshlessDeformations_SIG05.pdf >>, Proceedings of ACM SIGGRAPH 2005, vol. 24, Issue 3, Jul. 2005, pp. 1-8.

Rivers, et al., "FastLSM: Fast Lattice Shape Matching for Robust Real-Time Deformation", Retrieved at << http://citeseerx.ist.psu.edu/viewdoc/download?doi=10.1.1.92.868&rep=rep1&type=pdf >>, ACM SIGGRAPH 2007, Aug. 5-9, 2007, pp. 1-6.

Saito, et al., "3D Physics-Based Brush Model for Painting", Retrieved at << http://www.img.cs.titech.ac.jp/npr/saito/siggraph99saito.pdf >>, ACM SIGGRAPH 99 Conference, Aug. 8-13, 1999, pp. 1-26.

Straussmann, "Hairy Brushes", Computer Graphics SIGGRAPH '86, 1986, vol. 20, pp. 225-232.

Laerhoven, et al., "Brush Up Your Painting Skills", Retrieved at << http://doclib.uhasselt.be/dspace/bitstream/1942/4049/1/article.pdf >>, The Visual Computer: International Journal of Computer Graphics, vol. 23, Issue 9, Aug. 2007, pp. 1-9.

Vandoren, et al., "FluidPaint: an Interactive Digital Painting System Using Real Wet Brushes", In Proceedings of IEEE Tabletop and Interactive Surfaces, 2009, pp. 1-4.

White, et al., "Capturing and Animating Occluded Cloth", in SIGGRAPH '07, ACM SIGGRAPH 2007 papers, ACM, 2007, pp. 1-8.

Xu, et al., "A Solid Model Based Virtual Hairy Brush", Retrieved at << http://www.cs.hku.hk/research/techreps/document/TR-2002-04.pdf >>, Tech Report, Jul. 2002, pp. 1-44.

Smith, "Digital Paint Systems: An Anecdotal and Historical Overview", Retrieved at << http://design.osu.edu/carlson/history/PDFs/paint.pdf >>, IEEE Annals of the History of Computing, Apr.-Jun. 2001, vol. 23, No. 2, pp. 4-30.

Okaichi, et al., "A Virtual Painting Knife", Retrieved at << http://nis-lab.is.s.u-tokyo.ac.jp/~okaichi/CGI2008_CR_final.pdf >>, The Visual Computer: International Journal of Computer Graphics, vol. 24, Nos. 7-9, Jul. 2008, pp. 1-9.

Curtis, et al., "Computer-Generated Watercolor", Retrieved at << http://grail.cs.washington.edu/pub/papers/curtis-1997-cgw.pdf >>, In Proceedings of ACM SIGGRAPH, 1997, pp. 1-10.

Baxter, et al., "IMPaSTo: A Realistic, Interactive Model for Paint", Retrieved at << http://gamma.cs.unc.edu/IMPASTO/publications/Baxter-IMPaSTo_Print-NPAR04.pdf >>, Proceedings of the 3rd international symposium on Non-photorealistic animation and rendering, 2004, pp. 1-12.

Baxter, et al., "A Viscous Paint Model for Interactive Applications", Retrieved at << http://gamma.cs.unc.edu/VISCOUS/Baxter-ViscousPaint-CASA04.pdf >>, Computer Animation and Virtual Worlds, vol. 15, Issue 3-4, Jul. 2004, pp. 1-8.

Rudolf, et al., "A Bidirectional Deposition Model of Wax Crayons", Retrieved at << http://www.cs.usask.ca/~mould/papers/crayon-cgf.pdf >>, Computer Graphics Forum, vol. 24, No. 1, Mar. 2005, pp. 1-13.

Chu, et al., "MoXi: Real-Time Ink Dispersion in Absorbent Paper", In Proceedings of ACM SIGGRAPH 2005, 2005, pp. 1-8.

Haevre, et al., "From Dust till Drawn: A Real-time Bidirectional Pastel Simulation", Retrieved at << http://research.edm.uhasselt.be/~wvanhaevre/papers/cgi07.pdf >>, The Visual Computer: International Journal of Computer Graphics, vol. 23, Issue 9, Aug. 2007, pp. 1-8.

Weiskopf, D., "Dye Advection without the Blur: A Level-Set Approach for Texture-Based Visualization of Unsteady Flow", Retrieved at << http://www.vis.uni-stuttgart.de/~weiskopf/publications/eg2004dye.pdf>>, Eurographics 2004, vol. 23, No. 3, 2004, pp. 1-10.

Kim, et al., "Flowfixer: Using BFECC for Fluid Simulation", Retrieved at << http://www.gvu.gatech.edu/~jarek/papers/FlowFixer.pdf >>, Eurographics Workshop on Natural Phenomena (2005), Sep. 2005, pp. 1-6.

Phong, Bui Tuong, "Illumination for Computer Generated Pictures", Retrieved at << http://jesper.kalliope.org/blog/library/p311-phong.pdf>>, Communications of the ACM, vol. 18, Issue 6, Jun. 1975, pp. 311-317.

\* cited by examiner

SIMULATING PAINTING

BACKGROUND

Artists have conventionally utilized brushes and paint to create a work of art on a canvas. An artist has the freedom to choose a type and size of canvas, a type and size of brush, and types and colors of paint to create a work of art. Different canvases, brushes, and paints give the artist a great amount of freedom in generating the work of art.

As computers have become more popular and readily accessible, paint simulation programs have been created that are configured to simulate artistic painting on a computer. These simulation programs have traditionally not been particularly robust or realistic. For example, many paint simulation programs utilize two-dimensional stamps of a fixed shape and size, such as a circle or square. A user selects the stamp, selects the color, and then utilizes an input device (such as a mouse) to stamp the shape repeatedly on a computer screen in accordance with user input. It can be readily ascertained, however, that real-world paintbrushes have several degrees of freedom, such that the size and shape of the footprint of the paintbrush changes as the user handles the paintbrush.

Additionally, current paint simulation programs include techniques for simulating deposition of paint upon a three-dimensional model of a paintbrush to a canvas. Many conventional techniques assume that the paintbrush does not pick up any paint from the canvas and stamps over any existing paint. In real-world painting, however, a paintbrush will pick up some paint that is on the canvas, and smears will be created. Existing solutions for simulating this overlaying of paint have issues with sampling artifacts and tessellation, resulting in suboptimal simulation.

SUMMARY

The following is a brief summary of subject matter that is described in greater detail herein. This summary is not intended to be limiting as to the scope of the claims.

An image editing simulation system is described herein, wherein in an example embodiment the image editing simulation system can be utilized to simulate the act of painting with a paintbrush. A deformation table is generated that is indicative of deformations of an image editing tool, such as a paintbrush, when the image editing tool is used on a canvas. The deformation table can be generated by observing real-world paintbrush deformations, for example, through utilization of a camera, and measuring such deformations.

A sensing apparatus can be utilized to sense user input with respect to a simulated painting environment. The sensing apparatus may be a combination of a static pad and a stylus, for instance, wherein a user employs the stylus in a manner similar to a paintbrush. The sensing apparatus can be configured to sense user intent with respect to utilization of an image editing tool over a computer-implemented canvas, wherein the user intent includes direction of movement of the image editing tool, orientation of the image editing tool with respect to the canvas, etc. This sensed data can be utilized to access the deformation table, and a computer-implemented three-dimensional model of at least a portion of the image editing tool can be generated based at least in part upon the sensed data in a data-driven approach.

Furthermore, a three-dimensional model (generated in any suitable fashion) of an image editing tool can be utilized to deposit paint on a canvas in an image-editing environment. For instance, a footprint can be ascertained where the modeled image editing tool (e.g., paintbrush) is in contact with a computer-implemented canvas. This footprint can be a two-dimensional footprint that is derived from the three-dimensional model. Thereafter, a paint pickup map can be generated and updated, wherein the paint pickup map comprises a plurality of cells, and wherein resolution of the paint pickup map corresponds to a paint map of the computer-implemented canvas. The pickup map can sit underneath the brush, and can be used for storing paint picked up from the canvas (instead of mapping this data directly onto the brush geometry). For instance, the paint pickup map can comprise data that is indicative of a color and amount of paint on the modeled input tool at the footprint, and the paint map of the canvas can comprise data that is indicative of a color and amount of paint on the canvas. The correspondence of cells in the paint pickup map and the cells in the paint map can mitigate sampling artifacts existent in conventional solutions. Additionally, a canvas snapshot buffer can be employed to avoid repeated resampling of paint by preventing pickup of paint just deposited, while pickup of paint less recently deposited is allowed.

Other aspects will be appreciated upon reading and understanding the attached figures and description.

DETAILED DESCRIPTION

Figure 1:
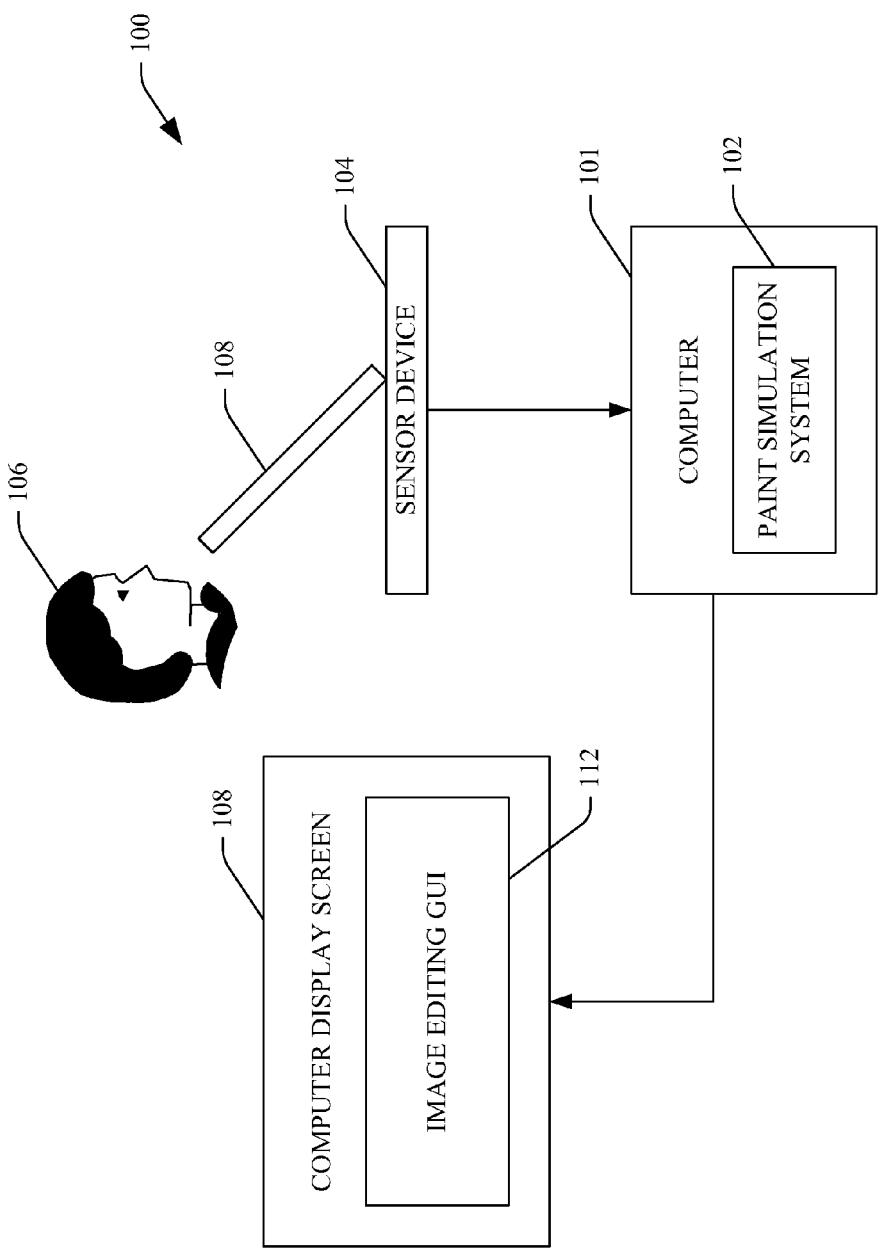
FIG. 1 is a functional block diagram of an example system that facilitates computer-simulated image-editing.

Various technologies pertaining to simulating image editing, such as real-world artistic painting, utilizing a computer will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates simulating artistic painting utilizing a computer is illustrated. The system 100 includes a computer 101 that comprises a paint simulation system 102. The system 100 further comprises a sensor device 104 that is configured to receive input data from a user 106. For example, the user 106 can utilize an input mechanism 108, wherein the sensor device 104 is configured to sense movement and/or position of the input mechanism 108.

The sensor device 104 can output data that is indicative of the movement and/or position of the input mechanism 108, and such data can be received by the computer 101. A computer display screen 110 is in communication with the computer 101, such that the computer 101 can cause the computer display screen 110 to display graphical data. Specifically, the paint simulation system 102 can be configured to cause the computer display screen 110 to display an image editing graphical user interface (GUI) 112, wherein the image editing GUI 112 can include a graphical depiction of a canvas, paint selections such that the user 106 can select a type and/or color of paint to employ, amongst other graphical data. Thus, the paint simulation system 102 is configured to provide a computer-implemented simulation environment, wherein images caused to be displayed in the image editing GUI 112 are based at least in part upon user input detected by the sensor device 104.

In an example embodiment, the input mechanism 108 can be a pen-like device, and the sensor device 104 can be a static pad or other suitable sensing pad (e.g., a capacitive sensing pad, a pad that is configured to detect reflected light, an image capture system, . . . ). Thus, the user 106 can treat the input mechanism 108 as if it were a brush (size and type of which can be selected by way of the image editing GUI 112), and the user 106 can treat the sensor device 104 as if it were a canvas. For example, the user 106 can select a type of brush and type/color of paint through utilization of the image editing GUI 112, and can begin moving the input mechanism 108 along the sensor device 104 as if the user 106 were painting on a canvas. The user 106 can monitor the image editing GUI 112 on the computer display screen 110 to ensure that the resulting artistic work is reflective of the intent of the user 106. Specifically, the paint simulation system 102 can receive output from the sensor device 104 that senses position of the input mechanism 108 with respect to the sensor device 104 and/or movement of the input mechanism 108 over such sensor device 104, and can update images in the image editing GUI 112 based at least in part upon such sensed data.

In another embodiment, the input mechanism 108 can be a finger of the user, and the sensor device 104 can be a static pad or some other suitable sensor. The sensor device 104 can be configured to output data that indicates position of the finger (including a height field of the finger) of the user 106, and the paint simulation system 102 can cause images to be displayed in the image editing GUI 112 that are reflective of the artistic intent of the user 106.

In yet another embodiment, the sensor device 104 and the input mechanism 108 can be combined in a single device, such as a mouse. For example, through movement of a mouse on a mouse pad and selection of one or more buttons on the mouse, the user 106 can cause the mouse to output data that is indicative of movement of a paintbrush or other suitable artistic device over a canvas. The paint simulation system 102 can receive such data, and can cause updated images to be displayed in the image editing GUI 112 on the computer display screen 110.

In still yet another embodiment, the sensor device 104 can be integrated into the computer display screen 110, such that the computer display screen 110 is a touch-sensitive display screen. The user 106 can move the input mechanism 108 over the computer display screen 110 as if the user 106 were painting on a canvas, and the paint simulation system 102 can cause the image editing GUI 112 to update images on the computer display screen 110 based at least in part upon sensed movement of the input mechanism 108 over the computer display screen 110. While several examples have been given above, it is to be understood that the paint simulation system 102 can be configured to simulate real-world artistic painting/image editing based at least in part upon any suitable input data that is representative of position/movement of a three-dimensional image editing tool (paintbrush) over a canvas. For instance, the sensor device 104 can be configured to detect orientation of the input mechanism (in three dimensions), can detect pressure applied by the user 106 with respect to the input mechanism 108, amongst other data that is indicative of intent of the user 106 with respect to painting on a canvas. Operation of the paint simulation system 102 will now be described in greater detail.

Figure 2:
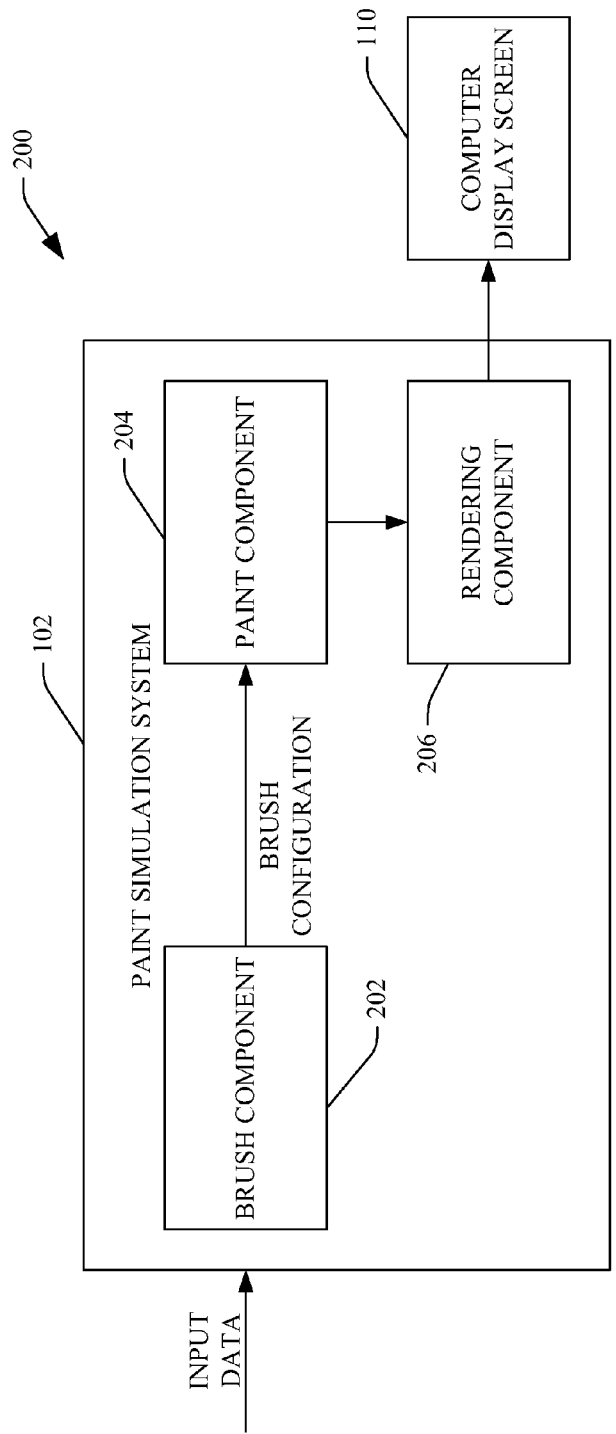
FIG. 2 is a functional block diagram of an example system that facilitates computer-simulated image editing.

Turning now to FIG. 2, an example system 200 that facilitates simulating real-world artistic painting/image editing is illustrated. The system 200 comprises the paint simulation system 102 and the computer display screen 110. As indicated above, the paint simulation system 102 receives input data from a sensor device, wherein such input data can be indicative of a desired orientation of a paintbrush with respect to a computer-implemented canvas. The input data can also comprise an indication of a type and color of paint desirably applied to the canvas by the paintbrush, a type of canvas, a type and/or size of paintbrush, etc.

The paint simulation system 102 comprises a brush component 202 that generates a three-dimensional model of a paintbrush (a simulated paintbrush) with an orientation with respect to a canvas that is indicative of intent of the user, wherein the three-dimensional model is based at least in part upon the input data. For example, the brush component 202 can utilize a data-driven approach to generate the three-dimensional model, where observed deformations of brushes in real-world applications are utilized by the brush component 202 to simulate brush deformation in accordance with the input data.

The paint simulation system 102 further comprises a paint component 204 that receives the brush configuration output by the brush component 202 as well as input data that indicates a type of paint on the simulated paintbrush and an amount of paint on the simulated paintbrush. The paint component 204 determines a footprint of the simulated brush, and generates a two-dimensional paint pickup map, wherein cells of the two-dimensional paint pickup map correspond to cells of a paint map of a computer-implemented canvas. This correlation between cells of the two-dimensional paint map and the computer-implemented canvas mitigates sampling artifacts that can occur without such correlation.

The paint simulation system 102 also comprises a renderer component 206 that is configured to render an artistic work on a computer-implemented canvas displayed on the computer display screen 110. The renderer component 206 can utilize any suitable rendering technique to render the artistic work on the computer display screen 110. Furthermore, the renderer component 206 can be configured to render paint such that it appears thin on the computer display screen 110, can control glossiness of paint as it appears on the computer display screen 110, etc.

Figure 3:
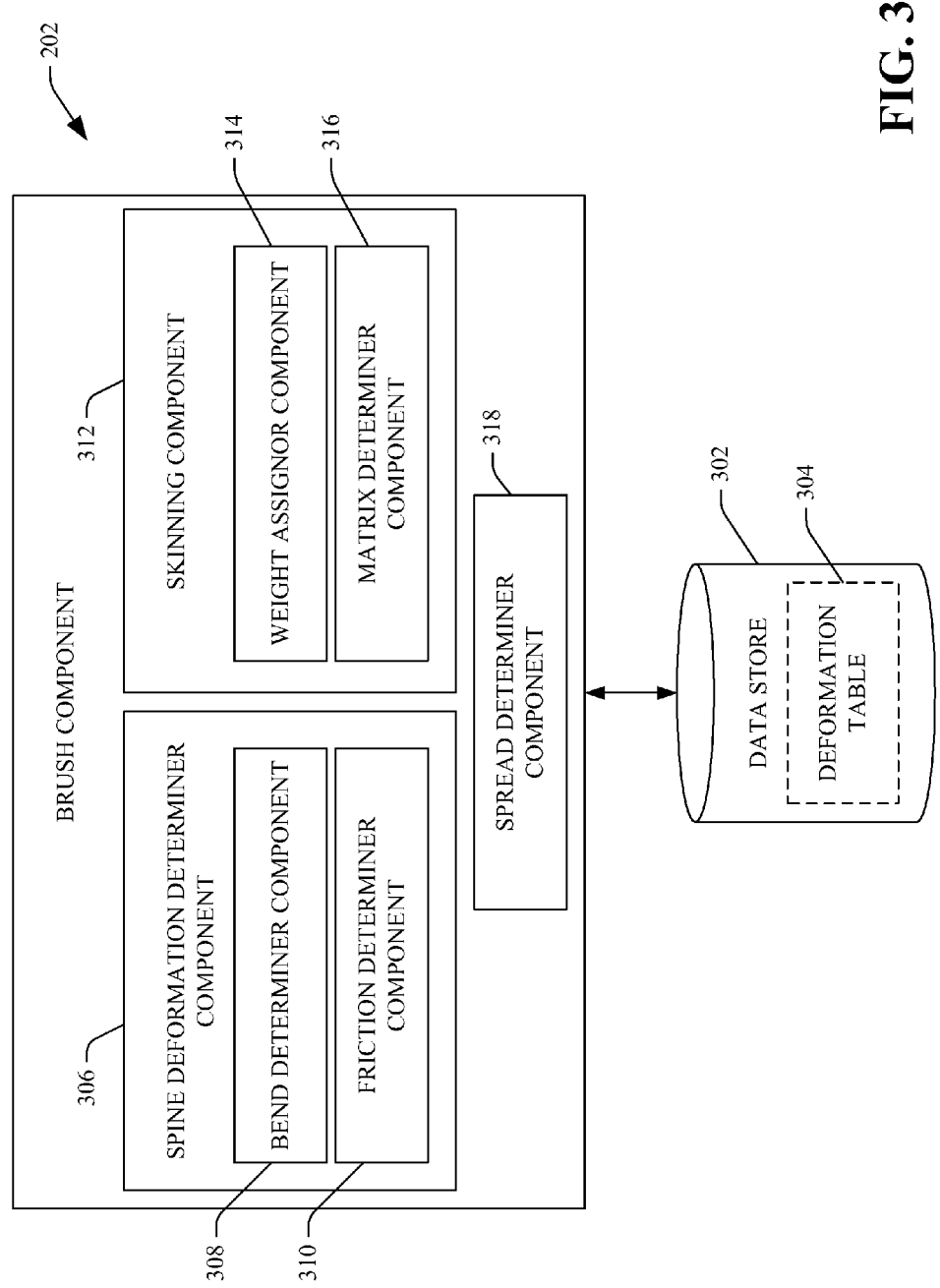
FIG. 3 is a functional block diagram of an example system that facilitates generating a computer-implemented three-dimensional model of an image editing tool for utilization in an image editing application.

Turning now to FIG. 3, the brush component 202 is described in greater detail. The brush component 202 has access to a data store 302 that retains a deformation table 304. The deformation table 304 comprises data indicative of deformation of bristles of a paintbrush as position of such paintbrush alters with respect to a canvas. For instance, the deformation table 304 can comprise data pertaining to control bristles or spines, which can be a subset of bristles of a brush. Typical bristle deformations lie on or near a plane. Thus, when obtaining real-world brush deformation measurements, such measurements can be in a single reference plane, which can lead to a parameterized space of deformations with two degrees of freedom. The first degree of freedom can be height of a bristle root over a canvas surface, and the second degree of freedom can be an angle of attack at the root of the bristle.

Figure 4:
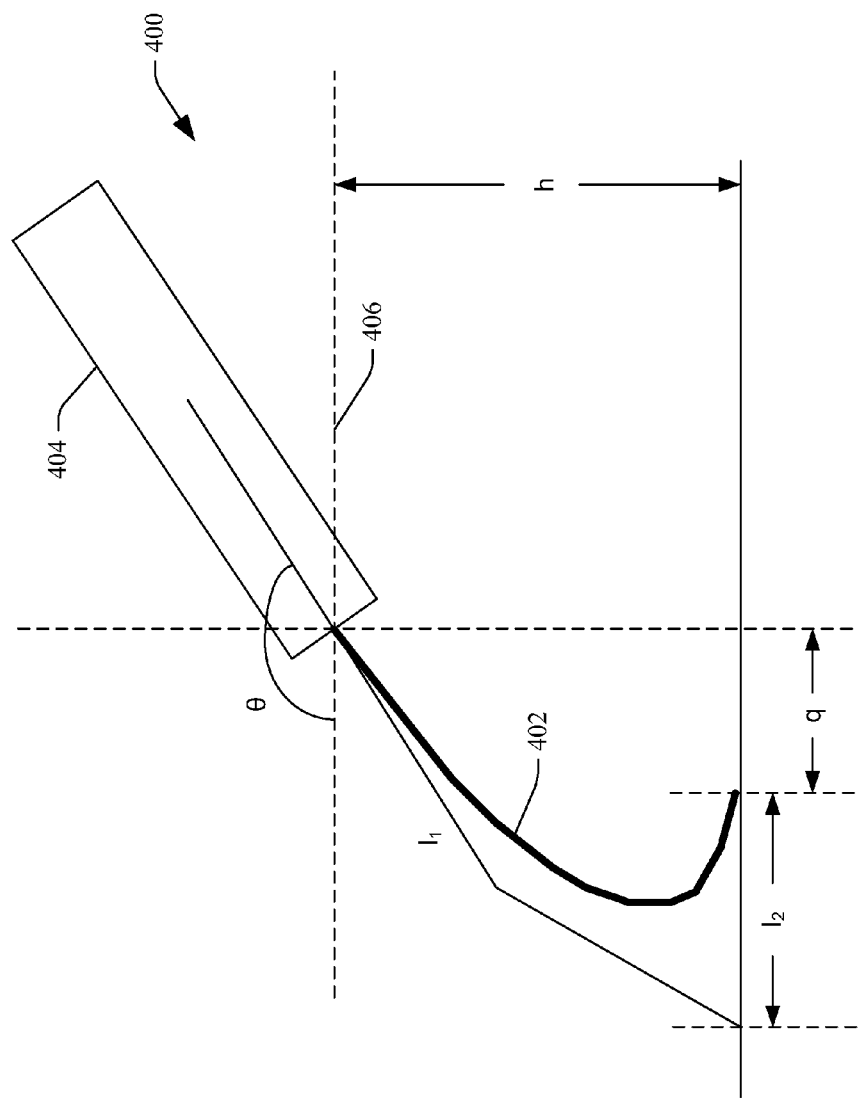
FIG. 4 illustrates a reference deformation of a control bristle of a paintbrush.

Turning briefly to FIG. 4, an example depiction 400 of geometry of a reference deformation of a control bristle 402 is illustrated. In an example embodiment, a camera or other suitable capture device can be utilized to capture movement of a paintbrush over a canvas. Video frames can be analyzed and curves (along deformed bristles and/or the centerline of a brush) can be traced or automatically located. For instance, image segmentation and optimal fitting of curves to a medial axis may be employed to automatically extract curves in the paintbrush captured in an image. Each curve (deformation) can be modeled as a single cubic Bézier segment, although other modeling techniques, such as through utilization of a fourth order curve, are contemplated and are intended to fall under the scope of the hereto-appended claims. Pursuant to an example, triplets $(l_1, l_2, q)$ can be indexed in the deformation table 304 by the bristle base angle $\theta$ and the height h of a handle 404 above a canvas 406. $l_1$ and $l_2$ can be lengths of sides of a first and last edge of a cubic Bézier control polygon, and q can be a distance along an axis in a reference coordinate system.

For purposes of explanation, a rest pose coordinate system for the paintbrush can be assumed where the canvas is in the X-Y plane and the paintbrush handle, in a rest position, points upward in the Z direction. Reference deformations can be assumed to be in the X-Z plane.

When generating the deformation table 304, numerous optimizations can be made. The directions of tangents at the ends of the curves can be predetermined by the ferrule of the paintbrush at one end and the canvas, which acts as a simple support, at the other. Thus, the lengths of the tangents without directions can be stored in the deformation table 304. Each curve root can be translated to the origin, so the remaining data to store is the location of the distal control point on the curve. However, the Z coordinate is just the height of the bristle, which is a lookup parameter, so such coordinate need not be stored (the X coordinate can be stored). Accordingly, deformed bristle geometry can be stored in the deformation table 304 using the aforementioned 3 floating point values: the two tangent lengths and the X coordinate of the tip of the bristle.

Returning to FIG. 3, the brush component 202 comprises a spine deformation determiner component 306 that determines deformation of bristles of the simulated paintbrush based at least in part upon the input data and contents of the deformation table 304. The spine deformation determiner component 306 comprises a bend determiner component 308 that determines an equilibrium bend energy curve for the simulated paintbrush. To determine equilibrium bend energy curve utilizing the deformation table 304, the bend determiner component 308 can approximate a bilinear interpolation utilizing the four closest data points in terms of the angle $\theta$ and a normalized height $\hat{h}$ in the deformation table 304. In an example, the normalized height can be 1 at the point the bristle is just in contact with the surface, and 0 when the bristle root reaches the canvas. This allows the bend determiner component 308 to meaningfully interpolate heights at different angles. The result of the lookup is the end tangent lengths and the X position for the distal control point $(l_1, l_2, q)$.

The bend determiner component 308 can then rotate this curve in the reference X-Z plane to coincide with the equilibrium bend energy plane. The equilibrium bend energy plane is the perpendicular plane to the canvas, and passing through the transformed tangent of the bristle root (the one with length $l_1$). The bend determiner component 308 can accomplish this by applying an appropriate rotation about the Z axis to each of the reference control points. A complication that arises, however, is that for each given bristle angle there can be two possible equilibrium positions corresponding to bristles bent forward and bristles bent backwards. The bend determiner component 308 can disambiguate these two cases by looking up both angles ($\alpha$ and $\pi-\alpha$) and picking the case that puts the brush tip closest to the location of the brush tip in the previous frame. Other rules are also contemplated, such as causing multiple control bristles to deform in a same direction for consistency, instead of allowing some control bristles to bend forward while others bend backward.

The spine deformation determiner component 306 also comprises a friction determiner component 310 that determines a measure of friction of the simulated paintbrush as it passes over a computer-implemented canvas. A table of equilibrium energy generated by the bend determiner component 308 encodes the configuration that the paintbrush would take if all friction were neglected. The friction determiner component 310 is configured to take into account effects of friction to more realistically generate a model of a paintbrush. Frictional forces act to keep the status quo. Thus, ignoring spring energy, a bristle would tend not to move from frame to frame. Accordingly, in some sense the optimal configuration with respect to friction is simply the previous configuration. This provides two reference configurations: the bend energy equilibrium configuration output by the bend determiner component 308 and a friction-only configuration.

Figure 5:
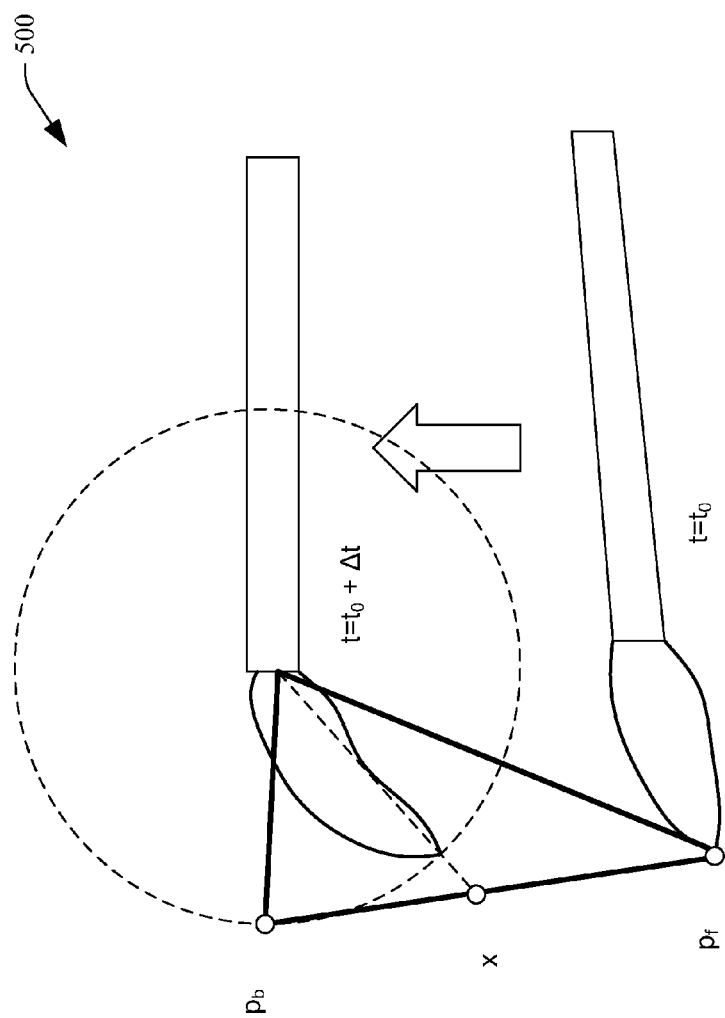
FIG. 5 illustrates an example depiction of modeling frictional forces.

Referring briefly to FIG. 5, an example depiction 500 of how the friction determiner component 310 treats friction is depicted. By assuming that within a given time step points move linearly, the friction determiner component 310 can treat friction as a cone-shaped energy well that requires work to escape. This follows from the Coulomb model of friction that offers a constant resistive force in the opposite direction of any motion. Integrating this leads to the cone-shaped well. The energy required to move from point $p_f$ to point x as shown in FIG. 5 is thus the following:

$$E_f = \mu f_N \|p_f - x\|,$$

where $\mu$ is a coefficient of friction, $f_N$ is a normal force, $p_f$ is the position a point had in the last timestep, and x is the unknown equilibrium that is desirably solved for by the friction determiner component 310.

Bending energies, however, can be approximated by quadratic functions in bend angles:

$$E_b = k_b |\phi|^2,$$

where $k_b$ is a bending spring constant, and $\phi$ is the bend angle of a particular joint of a discretized control bristle. These relations can be summed up joint-wise in 3-dimensions to get a total energy function, and the relations can be solved for using non-linear optimization. Ultimately, however, motions of different joints and the bend angles between such joints are highly correlated because the quadratic energy penalizes outliers. Neighboring joints tend to have a similar $\phi$.

Accordingly, the fringe determiner component 310 can utilize an alternate approach, wherein one representative point is analyzed. This point can be the tip of the control bristle, and instead of reviewing bend energy as a function of bend angle, the small angle approximation can be utilized to arrive at the following:

$$E_b = k_b \|p_b - x\|^2$$

where $p_b$ is the bend energy equilibrium position that the bristle tip would attain if friction were ignored. It can be noted that the bending energy can be accounted for due to the canvas constraint in the deformation table 304. Accordingly, $k_b$ can represent only lateral bending in the X-Y plane. Summing $E_f$ and $E_b$ together, it can be shown that the minimum energy solution lies on the line between $p_f$ and $p_b$. This allows the problem to be reduced to one dimension, and the friction determiner component 310 can solve the problem analytically.

For example, the minimum can be found at the following:

$$x = p_f + \xi(p_b - p_f), \text{ where}$$

$$\xi = \max\left(0, \frac{k_b \|p_b - p_f\| - \mu f_N}{k_b \|p_b - p_f\|}\right).$$

In an example, $k_b$ can be set to equal 1 and $\mu=0.75$ when $f_N=1$. Furthermore, normal force can be added based upon a brush compression ratio K. For instance, $f_N$ can be set to equal $0.7+20*\kappa^2$, with $\mu=0.2$ and $k_b=\kappa$.

Once the friction determiner component 310 finds the minimum value for x, this value can be used as the direction in which to orient the third and fourth control points of the Bézier, while the second control point still uses the $p_b$ direction explained previously. Thus, the friction determiner component 310 can effectively model how friction pulls on the tip of the brush, but does not change the tangent of the end of the bristle that is clamped by the ferrule of the brush. Additionally, the friction determiner component 310 can model the internal brush friction as part of the single friction energy.

Returning again to FIG. 3, once the bend of control bristles and friction between bristles of the brush and canvas have been ascertained by the bend determiner component 308 and the friction determiner component 310, respectively, a skinning component 312 can determine mesh deformation and skinning of the simulated brush. For mesh deformation based upon motion of the control bristles, the skinning component 312 can subdivide each Bézier curve non-uniformly in unit arclength at points $s_o$ according to the following cubic function:

$$s_o = \frac{1}{2}s^3 - \frac{3}{2}s^2 + 2s,$$

where s=i/n for i=0 . . . n. The non-uniform spacing has the effect of placing more points near the tip where higher curvature deformations are expected. To deform mesh vertices, the skinning component 312 can utilize standard linear blend skinning (LBS), thereby allowing utilization of fast hardware-based vertex shaders to implement deformation. Since standard LBS is a general spatial deformation technique, the brush geometry need not be a closed mesh or even a mesh. That is to say, any vertex-sampled geometry can be deformed by the skinning component 312.

The skinning component 312 can include a weight assignor component 314 that can assign weights to vertices of the brush mesh. The weight assignor component 314 can utilize a technique based on radial basis functions (RBF) to assign bone weights to vertices. For instance, the weight assignor component 314 can utilize the kernel function $\Phi(x, y) = \|x-y\|$ that corresponds to a bi-Laplacian fit to the data in three dimensions. RBF coefficients $C_{i,j}$ can be determined by solving the following linear system:

$$\Phi C = F \quad (1)$$

where $\Phi_{ij} = \Phi(x_i, x_j)$. The sites $x_i$, $1 \le i \le N_{sites}$ can be determined by sampling each bone along the length of the bone (e.g., 5 samples per bone). The right-hand side data terms can be defined as follows:

$$F_{ij} = \begin{cases} 1 & \text{if point } x_i \text{ on bone } j \\ 0 & \text{otherwise} \end{cases} \quad (2)$$

From the above the weight assignor component 314 can determine provisional vertex weights $\tilde{w}_{jk}$ with $1 \le k \le N_{vertices}$ according to the following RBF formula:

$$\tilde{w}_{jk} = \Sigma_{i=1}^{N_{sites}} C_{ij} \Phi(x_k, x_i) \quad (3)$$

These are essentially a set of $N_{bone}$ smooth cardinal functions each with a value of 1 on the given bone and 0 on other bones. For final weights $w_{jk}$, the weight assignor component 314 can drop all but the four largest weights at each vertex and re-normalize. The restriction to the four most influential bones is a performance optimization that allows more efficient skinning with hardware vertex shaders.

It can be ascertained that this weight truncation could lead to visible discontinuities. Such visible continuities can be eliminated by adding extra sites with $F_{ij}=0$ to the RBF interpolation. This works as follows: each bone can be associated with a $4^{th}$ order Voronoi region representing the zone in which that bone is one of the four closest bones. Vertices outside such region can be added as zero-valued sites relative to the given bone. In this way the weight enforcer component 314 can approximately enforce that there be no more than four influential bones per vertex while still obtaining a smooth RBF interpolation function.

As the brush is deforming, the skinning component 312 desirably determines what transformation matrix to associate with each bone at each step. The skinning component 312 comprises a matrix determiner component 316 that makes such determination. An example approach that can be undertaken by the matrix determiner component 316 is for a single spine brush. In such a case, the matrix determiner component 316 can select the matrix with uniform scale that rotates a bone in its rest configuration $[p_0, p_1]$ to the bone in its deformed position $[q_0, q_1]$, by rotating about the axis $(p_1-p_0) \times (q_1-q_0)$.

Another approach that can be undertaken by the matrix determiner component 316 that allows for matrix determinations for multi-spine brushes is also contemplated. For instance, the matrix determiner component 316 can utilize a constrained least-squares fit to guide bristles to find a substantially optimal matrix for each segment. The matrix determiner component 316 can take into consideration that bristles are inextensible along their length, but tufts of bristles may behave non-rigidly in orthogonal directions.

Such inextensibility constraint is simply that the segment $[p_0, p_1]$ is to be transformed into $[q_0, q_1]$. Subject to such constraint it is desirable to substantially minimize a weighted least-squares estimate of the local transform. If $p_i$ are sample points on bones in the rest pose of such pose and $q_i$ are the corresponding points in the deformed configuration, the matrix determiner component 316 can solve the following for all $1 \le j \le N_{bones}$ subject to the inextensibility constraint:

$$A_j = \underset{A}{\operatorname{argmin}} \sum_{i=1}^{N_{samples}} n_i \|A(p_i - p_j) - (q_i - q_j)\|^2.$$

The points $p_j$ can be chosen as the midpoint of each bone, and $p_i$ can be the endpoints of the bones. The matrix determiner component 316 can enforce the constraint approximately using a large penalty weight (e.g., $n_i$=500) for any points $p_i$ which are endpoints of the segment $p_j$.

For other points, the matrix determiner component 316 can utilize an approximate inverse square law for the weighting, $n_i=1/(d^2+0.1)$. Since the scaling in the bristle direction, however, is determined by the aforementioned constraint, the matrix determiner component 316 can give higher weighting to points located along other directions. Thus, X-Y distances can be made the dominant factor in the weights by defining $$d = \sqrt{\frac{\Delta x^2}{100} + \frac{\Delta y^2}{100} + \Delta z^2}.$$

It can be ascertained that for many possible brush geometries the least squares problem is underdetermined. For instance, if there is a single spine or all spines lie in a plane, then the appropriate off-axis or off-plane scale cannot be determined. Accordingly, the matrix determiner component 316 can solve the problem using a singular value decomposition of the normal matrix $U\Sigma^*U^T=PEP^T$, where $$\sum_{ii}^* = \begin{cases} 1/\sum_{ii} & \text{if } \sum_{ii} \neq 0 \\ 0 & \text{otherwise.} \end{cases}$$

For degenerate cases with some zero singular values, the matrix determiner component 316 can substitute a default scaling to complete the missing information in the result matrix. Post-multiplication of $R_{fit}$ by $U$ rotates the null axes into the last columns, where they can be set to be perpendicular to the non-degenerate axes, with default scaling. For the case of one missing axis, the matrix determiner component 316 can utilize the geometric mean of the two existing axes scales. A final post-multiplication by $U^T$ can provide a final $R_{fit}$.

For single spine brushes, a simpler approach is possible. There, for each segment, the matrix determiner component 316 can compute each associated transform as the concatenation $R_{bend}R_{twist}$, where $R_{bend}$ is the matrix that rotates the bristle base to the proper bend angle and $R_{twist}$ is the rotation of the bristle base about the Z-axis.

The brush component 202 can further comprise a spread determiner component 318 that is configured to control tip spreading for certain brushes or brush types. The spread determiner component 318 can be configured to control the fraction of tip spreading $t_{spread}$ through utilization of two factors: the compression ratio $\kappa$ and angle $\theta$ used as an index in the deformation table 304. In an example, the spread determiner component 318 can utilize the following algorithm in connection with control tip spreading:

$$t_{spread} = smoothstep\left(0, \frac{1}{2}, \kappa\right) smoothstep\left(\frac{\pi}{4}, \frac{\pi}{2}, \theta\right),$$

where smoothstep is a standard Hermite function. This can effectively increase spreading for higher pressure and steep angles of attack. The maximum spread ratio is a brush modeling parameter, which can be denoted as k. A spread of $1+t_{spread}(k-1)$ is attained at the tip of the brush. The base of the brush has a constant spread factor of 1. The spread determiner component 318 can apply the spread deformation to the vertices prior to the LBS in local coordinates. Because the LBS skinning can introduce a twist, the spread determiner component 318 can apply the deformation scaling in the X-Y plane as follows:

$$p'_{xy} = p_{xy} Rot(-\alpha_{twist}) \begin{pmatrix} 1 & 0 \\ 0 & d \end{pmatrix} Rot(\alpha_{twist}),$$

where d is a scale factor that can be calculated by way of any suitable matter, and $a_{twist}$ is the z-axis rotation part of the LBS matrix.

As described above, the output of the brush component 202 is a model of an image editing tool, such as a paintbrush, wherein the model of the image editing tool has deformations that are based at least in part upon the input data. In an example, the brush component 202 can be implemented through utilization of a graphical processing unit (GPU), since vertex weighting can be calculated in parallel. This hardware acceleration enhances the user experience, as the model of the paintbrush can be updated in real-time as the user interacts with the sensor device 104.

Described below is the paint component 204. In an example, the paint component 204 can receive the brush model output by the brush component 202. It is to be understood, however, that the paint component 204 can receive any suitable three-dimensional model of a brush, wherein configuration/deformation of such model is based at least in part upon user input. Also, a different paint component/model other than the one described below can utilize the brush model output by the brush component 202. Thus, in an example embodiment, the brush component 202 and the paint component 204 can be included in the paint simulation system 102. It is to be understood, however, that either the brush component 202 or the paint component 204 can exist and operate independently of the other.

Figure 6:
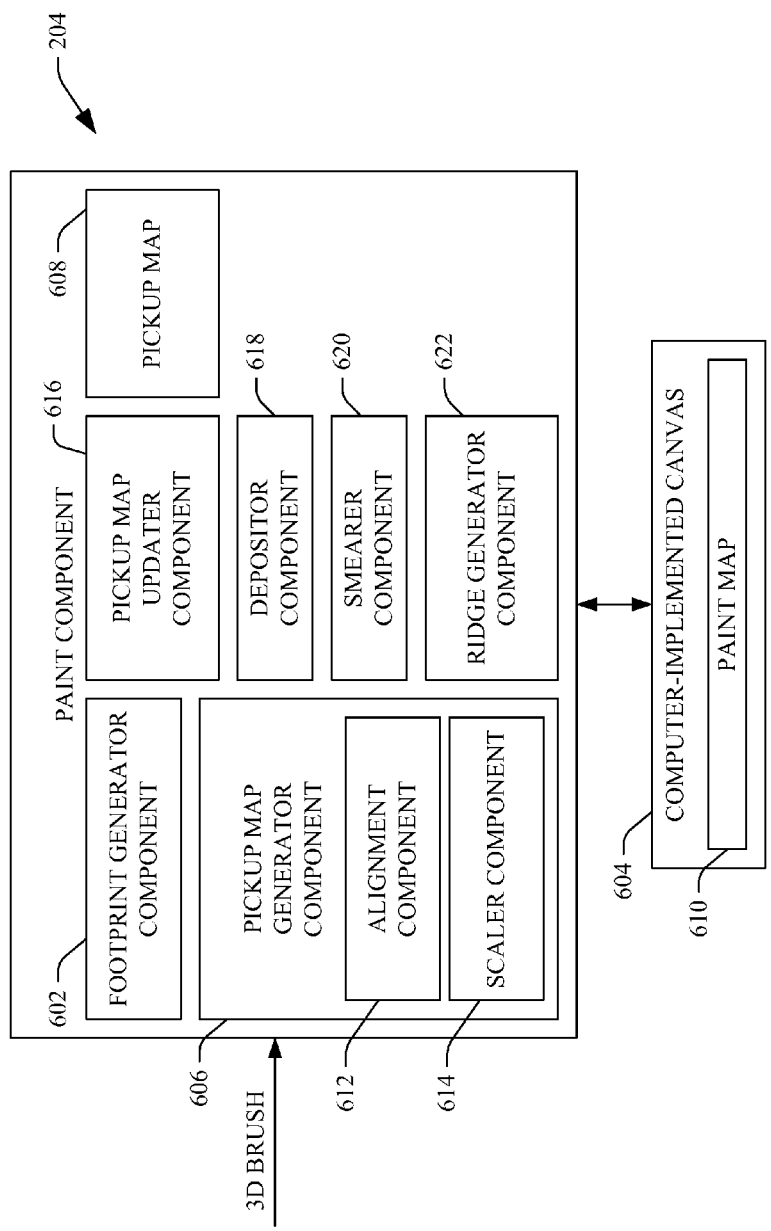
FIG. 6 is a functional block diagram of an example system that facilitates mapping paint from three-dimensional input data to a computer-implemented canvas.

With reference now to FIG. 6, an exemplary detailed depiction of the paint component 204 is illustrated. The paint component 204 receives a three-dimensional model of a brush (such as the model output by the brush component 202). This model can model deformation of a paintbrush at a particular position, and the paint component 202 can utilize such model to simulate deposition of paint on a canvas. As will be described in greater detail below, the paint component 204 can generate a two-dimensional map that has a resolution that corresponds to a resolution of a two-dimensional map of the canvas, wherein such correspondence of the maps substantially mitigates sampling artifacts.

The paint component 204 comprises a footprint generator component 602 that is configured to generate a footprint of the model of the paintbrush on a computer-implemented canvas. In an example, the footprint generator component 602 can render a depth value of the brush geometry to provide a brush height field. The footprint generator component 602 can access a computer-implemented canvas 604, and can modulate the brush height-field with a two-dimensional canvas height-field texture that models the tooth of the computer-implemented canvas 604, thereby generating the footprint of the brush. The footprint, in an example, can be stored in a buffer and later utilized for paint deposition on the canvas and paint pickup from the canvas. In another example embodiment, one or more deposition shader programs can be applied on the brush geometry such that footprint generation and paint deposition are combined into a single step.

The paint component 204 further comprises a pickup map generator component 606 that is utilized in connection with transferring paint from the brush to the computer-implemented canvas 604. Specifically, the pickup map generator component 606 generates a two-dimensional pickup map 608 that has a resolution that corresponds to a resolution of a paint map 610 of the computer-implemented canvas 604. The pickup map 608 can be utilized to represent a layer of paint picked up by the brush, and the paint map 610 can be utilized to represent paint deposited on the computer-implemented canvas 604. Accordingly, the geometry of the brush is in three-dimensions but the pickup information is represented as if the brush is two-dimensional. Conceptually, the pickup map 608 is a bitmap with a resolution that is substantially similar to the resolution of the computer-implemented canvas 604 (the paint map 610) that lies beneath the three-dimensional brush. Instead of performing bidirectional paint transfer between the computer-implemented canvas 604 and the 3-dimensional brush, paint operations can be performed between the computer-implemented canvas 604 and the pickup map 608. Irrespective of transformations of the brush, the resolution of the pickup map 608 remains substantially similar to the resolution of the paint map 610, issues pertaining to resampling caused by mismatched resolutions are mitigated.

The pickup map generator component 606 comprises an alignment component 612 that is configured to align a center of the pickup map 608 with an anchor point of the three-dimensional brush. In an example, the anchor point of the three-dimensional brush can be a centroid of the bristle geometry for a brush, a center of a base for a pastel stick, or the like.

The pickup map generator component 606 can also comprise a scaler component 614 that can scale size of the pickup map 608 based at least in part upon size of a brush that corresponds to the footprint output by the footprint generator component 602. For example, given a certain brush size, the scaler component 614 can utilize the diagonal of the three-dimensional bounding box of the brush in a rest position to bound size of the pickup map 608, thereby making the pickup map 608 large enough to cover the brush for all possible transformations. Furthermore, the scaler component 614 can set the height and width of the pickup map 608 to allow for various brush orientations. If the user scales the brush, the scaler component 614 scales the pickup map 608 in a corresponding manner to maintain substantially matched resolutions with the paint map 610.

Figure 7:
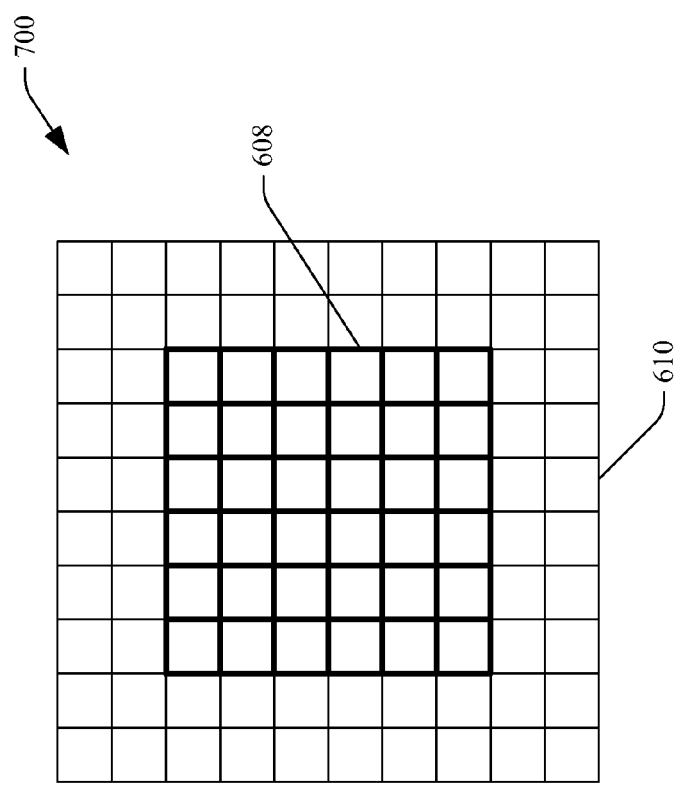
FIG. 7 illustrates an example mapping of a three-dimensional brush to a map of a canvas.

Turning briefly to FIG. 7, an example depiction 700 of the pickup map 608 versus the paint map 610 is illustrated. As can be ascertained, the resolution of the pickup map 608 corresponds to the resolution of the paint map 610. Moreover, in the example depiction 700, it can be ascertained that the alignment of the pickup map 608 is restricted to substantially match the alignment of the paint map 610. In other embodiments, however, the pickup map 608 can be misaligned with the paint map 610. For instance, restricting alignment of the pickup map 608 to that of the paint map 610 can effectively eliminate resampling due to geometry misalignment. However, this also means that paint picked up on one particular part of the brush does not stick to the same spot if the brush is rotated. Rotating the pickup map 608 about its center so that the colors stay close to their original three-dimensional positions largely alleviates this problem.

Returning to FIG. 6, the paint component 204 comprises a pickup map updater component 616 that updates the pickup map 608 based at least in part upon content of the pickup map 608 and the paint map 610. For example, as the brush position changes over the computer-implemented canvas 604, the pickup map updater component 616 can check if each cell in the pickup map 608 is at full capacity (e.g., the brush is full and thus cannot pickup any additional paint). If each cell in the pickup map 608 is not full, then the pickup map updater component 616 can analyze the paint map 610 to determine if there is already paint on the computer-implemented canvas 604 below the brush. For each cell that there is paint below the brush in the pickup map 608, the color in the paint map 610 is blended with the color in the pickup map 608, and the thickness of the cell in the pickup map 608 is increased. The thickness of the cells of the paint map 610 can remain the same or can be decreased when corresponding thickness is increased in the pickup map 608. Furthermore, the pickup map updater component 616 can reduce thickness in the pickup map 608 gradually to simulate consumption, thereby allowing the pickup map 608 to accept new paint pickups (and thereby allowing trails to be generated as the brush is smeared over a blank canvas area).

The paint component 204 also comprises a depositor component 618 that is configured to deposit paint onto the paint map 610 from the pickup map 608. In an example, the depositor component 618 can be configured to copy a source color of the brush onto the canvas as the footprint is imprinted onto the computer-implemented canvas 604, thereby generating solid strokes. In another example, the depositor component 618 can be configured to render paint strokes as a blend of the source color and content of the paint map 610, depending on the brush footprint value. To simulate re-deposition of paint pickup, the source color can be derived as:

$$C_S = lerp(C_I, C_P, A_P)$$

where $C_S$ is the source color, $C_I$ is the intrinsic color of the pastel stick or the brush loading, $C_P$ is the color on the pickup map 610, $A_P$ is the thickness in the pickup map 608, and lerp(a, b, i) is the linear interpolation function defined as a·(1−i)+b·i.

If additional steps are not taken, however, the overlapping imprints quickly saturate the stroke to the source color, resulting in a solid stroke of the source color on the computer-implemented canvas 604. To avoid this, the depositor component 618 can utilize a snapshot Ω of the paint map 610. In a typical paint simulation pipeline, paint is transferred between the brush and canvas at every impression along a stroke. In an example embodiment, the traditional pipeline can be modified through utilization of the snapshot buffer Ω as follows: before the first imprint of a stroke, the buffer can be initialized to be identical to the current paint map 610. Thereafter, before a subsequent imprint, Ω can be updated to contain a latest version of the paint map 610 except for a region covered by the pickup map 608 at a current position of the brush. By using the snapshot buffer Ω as the input paint map to the depositor component 618 instead of the paint map 610 itself, a tight feedback loop can be avoided during bidirectional paint transfer, and blurring can be prevented. The use of Ω also helps to avoid quickly saturating to the brush color when blending with the canvas paint. The abovementioned update scheme for Ω works well in allowing the effect of self-overlapping in general; however, for strokes with acute corners, the above update method misses the corner giving rise to visual artifacts. Accordingly, the depositor component 618 can update Ω with a complete snapshot when a large change in stroke direction is detected. Furthermore, if no self-overlapping is preferred, the depositor component 618 can update Ω only at the beginning of a stroke.

If the depositor component 618 does not utilize the snapshot buffer Ω, overlapping imprints may saturate the stroke to the source color, thereby outputting a solid stroke because the pickup map 608 is filled with paint just deposited. Thus, the snapshot buffer Ω can aid to avoid saturation of color while keeping the deposition algorithm utilized of the depositor component 618 relatively simple. Additionally, the presence or absence of the snapshot buffer Ω can be used as an artistic control. If additional blending is desired, the current paint map 610 can be utilized rather than the snapshot buffer Ω. The increased blurring can give an impression of wet blending (when solvent is added to the paint) where pigments mix more thoroughly. To control the amount of blending, an interpolation of the paint map 610 and the snapshot buffer Ω can be utilized by the depositor component 618.

Additionally, the amount of source color used to blend with paint on the computer-implemented canvas 604 can depend on the brush footprint value. With a low brush height-field value, the footprint is more modulated by the tooth of the computer-implemented canvas 604, which can give a more textural quality to paint deposited by the depositor component 618. If the height-field value is close to one (or some other maximum value), the footprint value can be more saturated towards one, which reduces the effect of the canvas tooth. Accordingly, the depositor component 618 can remap the brush height-field as an artistic control. For instance, the depositor component 618 can diminish such texture for oil painting while emphasizing such texture for pastel painting.

In some instances, an artist does not wish to paint on the canvas, but rather wishes to smear paint that is already existent on the canvas (e.g., with a finger or other suitable tool). Specifically, in real-life pastel painting, artists use their fingers or a tortillon to smear and blend colors. The paint component 204 can include a smearer component 620 that simulates such smearing. The smearer component 620 realizes the simulation by treating the user input as a deposition with just the paint pickup. The smearer component 620 can use the thickness in the pickup map 608 modulated with the footprint of the tool selected by the user as the deposited paint amount. It is to be noted that the smearer component 620 can utilize contents of the paint map 604 or the snapshot Ω when smearing on the computer-implemented canvas 604. The snapshot Ω can be used as an artistic control as mentioned above depending upon a level of mixing desired by an artist. Using contents of the paint map 604 (no snapshot) can cause color to blend more because the newly blended color is written to the paint map 610, which is then utilized for further blending.

Moreover, in real-life oil paintings, ridges in deposited paint left by brush bristles can be seen. The paint component 204 can comprise a ridge generator component 622 that simulates such ridges on the computer-implemented canvas 604 if the user wishes to generate an oil painting. The ridge generator component 622 utilizes a texture that can be referred to as a streak map to drive paint thickness accumulation and removal at various spots touched by the brush as paint is deposited on the computer-implemented canvas 604. The streak map has white and black "spots" scattered on a background of a gray value (0.5 in the range of [0, . . . , 1]). On the white spots, the ridge generator component 622 can accumulate paint thickness, and on the black spots the ridge generator component 622 can reset the thickness to a base value such that a new stroke that overlaps an old stroke would have room to accumulate ridges following the new stroke.

The ridge generator component 622 can apply the streak map either canvas-aligned or brush-aligned (similar to the pickup map 608). In an example, the streak map can be aligned to the brush, and the ridge generator component 622 can dynamically scale the texture coordinates to compensate for brush deformation. Additionally, the ridge generator component 622 can enable anisotropic texture filtering to ensure that the features on the streak map are well resolved. Furthermore, with a brush-aligned anisotropic streak map, it is possible to drag a brush sideways to give a different ridge quality.

Figure 8:
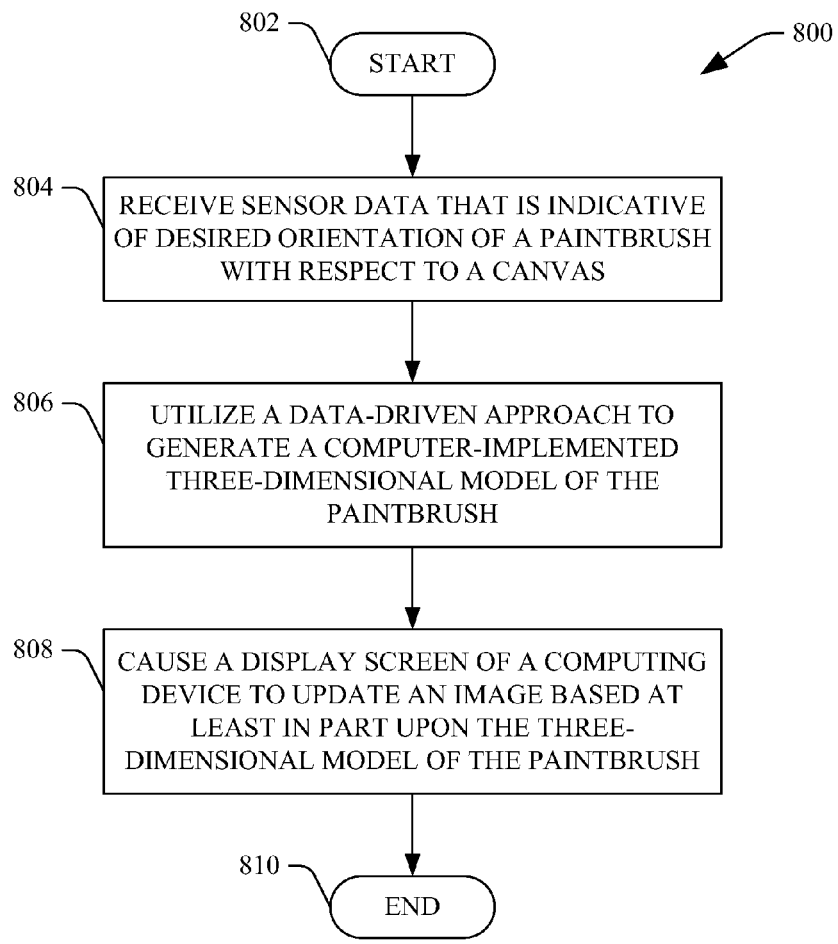
FIG. 8 is a flow diagram that illustrates an example methodology for generating a three-dimensional model of an image editing tool.
Figure 9:
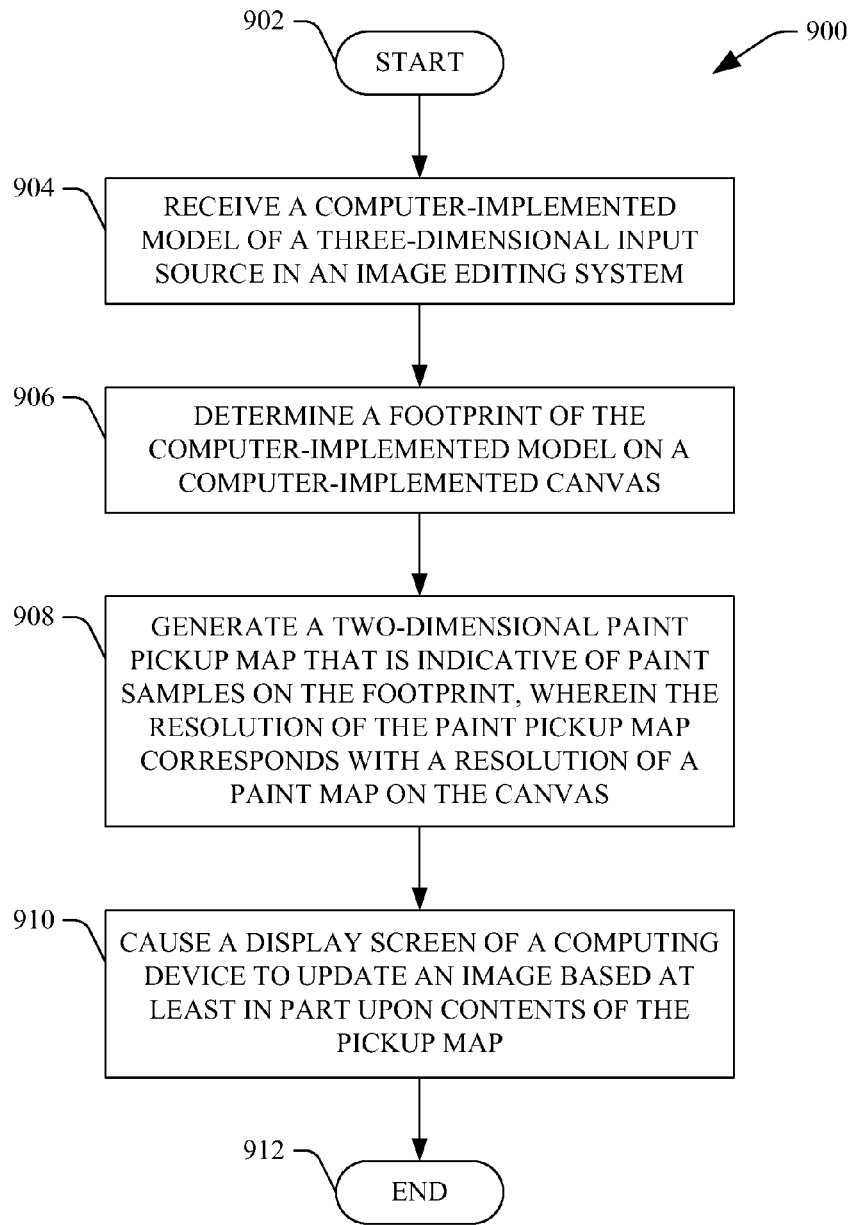
FIG. 9 is a flow diagram that illustrates an example methodology for generating a two-dimensional paint pickup map from a three-dimensional input.

With reference now to FIGS. 8-9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 8, a methodology 800 that facilitates generating a three-dimensional model of a paintbrush is illustrated. While the methodology 800 describes modeling of a paintbrush, it is to be understood that the methodology 800 can be employed to model other image editing tools, such as (but not limited to) chalk, pencils, pens, a rubbing tool, fingers, or other suitable tools that can be utilized to generate an image on a canvas. The methodology 800 begins at 802, and at 804 sensor data is received that is indicative of desired orientation of a paintbrush with respect to a canvas. At 806, a data-driven approach is utilized to generate a computer-implemented three-dimensional model of the paintbrush. As described above, a deformation table can be generated, and brush deformations can be interpolated based at least in part upon contents of the deformation table.

At 808, a display screen of a computing device is caused to update an image based at least in part upon the three-dimensional model of the paintbrush. For example, an image editing application such as a paint simulating application can cause brushstrokes to be displayed on a computer-implemented canvas that is viewable by way of the display screen. The methodology 800 completes at 810.

Now referring to FIG. 9, an example methodology 900 that facilitates simulating the act of painting is illustrated. The methodology 900 starts at 902, and at 904 a computer-implemented model of a three-dimensional input source is received. The input source can be a paintbrush, chalk, a human finger, etc.

At 906, a footprint of the computer-implemented model is determined with respect to a computer-implemented canvas. In an example, a brush deformed in some manner on a canvas will have a footprint where the brush is in contact with such canvas. Thus, the footprint is in two-dimensions.

At 908, a paint pickup map is generated that is indicative of paint samples on the footprint, wherein the resolution of the paint pickup map corresponds with a resolution of a paint map on the canvas. Specifically, since paint simulation is undertaken on a computer, samples are taken. That is, each cell of the paint pickup map can have an indication of color of paint and thickness of paint to be deposited onto the canvas. The resolution of the paint pickup map can correspond with a resolution of the paint map of the canvas, such that sampling artifacts are mitigated.

At 910, a display screen of a computing device is caused to update an image based at least in part upon contents of the paint pickup map. The methodology 900 completes at 912.

Figure 10:
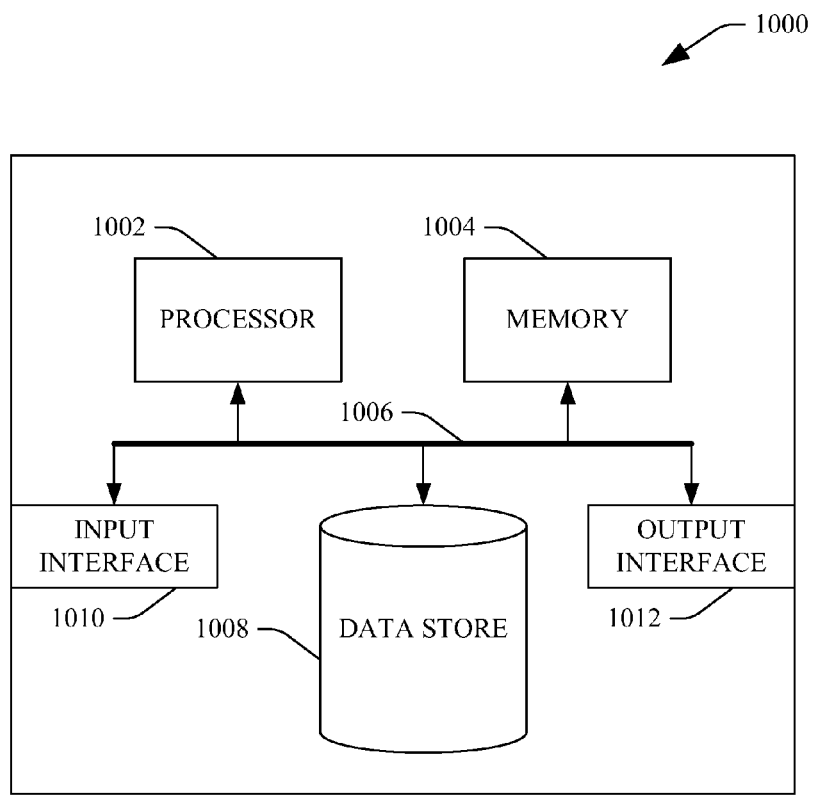
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a system that supports simulating the act of painting on a computer. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store a deformation table that is indicative of paintbrush deformations when a paintbrush is in contact with a canvas, a three-dimensional model of an artistic tool, a pickup map, etc.

The computing device 1000 additionally includes a data store 1008 that is accessible by the processor 1002 by way of the system bus 1006. The data store may be or include any suitable computer-readable storage, including a hard disk, memory, etc. The data store 1008 may include executable instructions, a deformation table, a paint map, a paint pickup map, etc. The computing device 1000 also includes an input interface 1010 that allows external devices to communicate with the computing device 1000. For instance, the input interface 1010 may be used to receive instructions from an external computer device, from an individual, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computing device that comprises:
a processor; and
a memory that comprises a paint simulation system that is executed by the processor, the paint simulation system comprising:
   a computer-implemented canvas that comprises a paint map that comprises first cells, the first cells have first values assigned thereto, each value in the first values is indicative of a color and an amount of paint at a location on the computer-implemented canvas of a respective cell in the first cells; and
   a plurality of components, comprising:
      a brush component that outputs a three-dimensional computer-implemented model of an image editing tool in contact with the computer-implemented canvas, a footprint defines a region on the computer-implemented canvas where the three-dimensional model of the image editing tool is in contact with the computer-implemented canvas; and
      a paint component that generates a two-dimensional paint pickup map for the footprint, the paint pickup map comprises second cells that have second values assigned thereto, each value in the second values is indicative of a color and an amount of paint on the model at a location of a respective cell in the second cells of the footprint, resolution of the paint pickup map matches resolution of the paint map, the paint component updates values of the second cells based upon values of the first cells when the model is transitioned over the computer-implemented canvas.

2. The computing device of claim 1, wherein the image editing tool is a paintbrush.

3. The computing device of claim 1, wherein the paint component comprises a footprint generator component that renders a depth value pertaining to geometry of the image editing tool to provide a height field, the footprint generator component accesses the computer-implemented canvas and modulates the height field with a two-dimensional canvas height-field texture to generate the footprint, the two-dimensional canvas height field texture models a tooth of the computer-implemented canvas.

4. The computing device of claim 1, wherein the paint component comprises an alignment component that is configured to align a center of the two-dimensional paint pickup map with an anchor point of the three-dimensional model of the image editing tool, the paint component identifies the footprint based upon alignment of the center of the two-dimensional paint pickup map with the anchor point of the three-dimensional model of the image editing tool.

5. The computing device of claim 1, wherein the paint component comprises a scaler component that scales size of the two-dimensional paint pickup map based upon size of the image editing tool that corresponds to the footprint.

6. The computing device of claim 1, wherein the paint component comprises a pickup map updater component that updates the two-dimensional paint pickup map based upon content of the two-dimensional paint pickup map when the model is transitioned over the computer-implemented canvas, the pickup map updater component updates at least one value for at least one cell in the second cells to indicate a blending of color in the paint map with color in the paint pickup map.

7. The computing device of claim 1, wherein the paint component comprises a depositor component that is configured to deposit paint onto the paint map from the two-dimensional paint pickup map.

8. The computing device of claim 7, wherein the depositor component receives a snapshot buffer of the paint map when depositing paint onto the paint map from the two-dimensional paint pickup map, wherein the snapshot buffer is a previous version of the paint map.

9. The computing device of claim 1, wherein the paint component is configured to cause an image displayed on a display screen of a computer device to be updated based at least in part upon input from a user captured by a sensor.

10. The computing device of claim 1 being configured to simulate one or more of oil painting or pastel painting.

11. The computing device of claim 1, wherein the brush component utilizes a data-driven approach to generate the three-dimensional model of the image editing tool.

12. The computing device of claim 11, wherein the brush component comprises a friction determiner component that computes a measure of friction of the image editing tool over a canvas when the brush component generates the three-dimensional model.

13. A method comprising the following computer-executable acts:
receiving data from a sensor that indicates a desired orientation of an image editing tool with respect to a canvas;
accessing a deformation table based at least in part upon the data from the sensor, wherein the deformation table comprises previously captured deformations of the image editing tool;
generating a computer-implemented three-dimensional model of the image editing tool based upon contents of the deformation table;
ascertaining a footprint of the three-dimensional model on a computer-implemented canvas based upon the desired orientation of the image editing tool with respect to the canvas and the model of the image editing tool, the computer-implemented canvas comprising a paint map that comprises first cells that have first values respectively assigned thereto, the first values indicative of respective colors and respective amounts of paint at respective locations of the first cells on the computer-implemented canvas;
generating a two-dimensional paint pickup map based upon the footprint, the paint pickup map comprising second cells having second values respectively assigned thereto, the second values indicative of respective colors and respective amounts of paint at respective locations of the second cells on the footprint, the paint pickup map and the paint map having matching resolutions;
based upon user input, detecting transition of the model over the computer-implemented canvas; and
responsive to detecting transition of the model over the computer-implemented canvas, bi-directionally updating the first values and the second values to simulate blending of paint that occurs when the image editing tool is transitioned over the canvas.

14. The method of claim 13, wherein the image editing tool is a paintbrush that comprises a plurality of bristles.

15. The method of claim 13, further comprising:
ascertaining a tooth of the canvas;
determining a height field of the three-dimensional model of the image editing tool; and
computing the footprint based at least in part upon the tooth of the canvas and the height field of the three-dimensional model.

16. The method of claim 14, further comprising:
computing a measure of friction that occurs as the image editing tool is moved over the canvas; and
generating the computer-implemented three-dimensional model based upon the measure of friction.

17. A computer-readable memory comprising instructions that, when executed by a processor, cause the processor to perform acts comprising:
receiving an indication that painting on a canvas is to be simulated;
receiving a selection of a paintbrush that is to be used when painting on the canvas is simulated;
receiving data from a sensor that is indicative of an orientation of an input tool with respect to a computer-implemented canvas, the computer-implemented canvas models the canvas;
generating a three-dimensional model of the paintbrush based upon the data received from the sensor and previously observed deformations of the paintbrush when applied to the canvas;
ascertaining a footprint of the three-dimensional model on the computer-implemented canvas based upon the data from the sensor;
positioning a two-dimensional paint pickup map over the computer-implemented canvas such that the two-dimensional paint pickup map encompasses the footprint, the paint pickup map representing paint on the paintbrush at positions in the footprint, wherein resolution of the two-dimensional paint pickup equals resolution of a paint map of the computer-implemented canvas, the paint map representing paint on the canvas modeled by the computer-implemented canvas;
detecting movement of the input tool based upon the data from the sensor; and
updating the paint pickup map based upon the paint map and the movement.

18. The method of claim 13, further comprising:
receiving an indication that smearing of paint is to be simulated on the canvas;
detecting movement of an input device over the computer-implemented canvas; and
updating at least one value in the first values based solely upon values in the first values.

19. The computer-readable memory of claim 17, the acts further comprising:
receiving an indication that smearing of paint is to be simulated on the canvas;
detecting further movement of the input tool over the computer-implemented canvas; and
updating the paint map based solely upon the paint map.

20. The computer-readable memory of claim 17, wherein generating the three-dimensional model of the paintbrush comprises:
accessing a deformation table based upon the data received from the sensor, wherein the deformation table comprises data about the observed deformations of the paintbrush when applied to the canvas at various orientations; and
generating the three-dimensional model of the paintbrush based upon content of the deformation table.

* * * * *